March 30, 1965 C. W. SMITH ETAL 3,175,430

CABLE STRIPPING MACHINE

Filed June 18, 1962 2 Sheets-Sheet 1

INVENTORS.
CHARLES W. SMITH
VICTOR I. KIMMEL

BY Robert L. Berger

ATTORNEY.

INVENTORS.
CHARLES W. SMITH
VICTOR I. KIMMEL
BY
Robert L. Berger
ATTORNEY.

United States Patent Office 3,175,430

Patented Mar. 30, 1965

3,175,430

CABLE STRIPPING MACHINE

Charles W. Smith, Baltimore, and Victor I. Kimmel, Whitemarsh, Md., assignors to Martin-Marietta Corporation, Baltimore, Md., a corporation of Maryland Filed June 18, 1962, Ser. No. 203,366
14 Claims. (Cl. 81—9.51)

This invention relates to an apparatus for stripping the insulation of a cable from the inner-conductors thereof and more particularly to such an apparatus which prevents the inner-conductors from being damaged in the process.

Numerous cable stripping machines have heretofore been devised, all of which employ a blade or other form of cutting tool that is caused to bear on the outside of the cable insulation so as to exert a compressive force on the cable. While these machines are quite satisfactory for salvaging cable materials or in other cable stripping operations where it is not necessary that the inner-conductors be protected from damage by the cutting tool, they are not suitable for cable stripping operations which require that the inner-conductors be protected from damage. No machine has heretofore been devised which will automatically strip the insulation from a cable in one operation while providing 100 percent reliability in protecting the inner-conductors from injury.

Those familiar with cable fabricating operations will readily appreciate the importance and significance of a cable stripping machine such as that herein provided which provides positive protection to the inner-conductors during the stripping operation. For instance, missile bases employed in the defense of this country utilize literally thousands of heavy insulated cables. These cables typically vary in size from ¾ to 2½ inches in diameter, being covered with a heavy rubber insulating jacket varying in thickness from ⅛ inch to 5/16 inch. Each of these cables may include as many as 200 inner-conductors. The outer insulation at the ends of each cable must be removed prior to installation at the missile site. The applicable military specifications require that the inner-conductors shall be installed absolutely free of damage and, consequently, preclude the use of any heretofore available cable stripping machine. The usual practice under such conditions is to manually insert a wedge for a distance of approximately one or two inches into the cable between the insulation and the inner-conductors. With this wedge serving as a protecting shield for the inner-conductors, a knife is employed to cut the insulation immediately above the wedge. The wedge is then inserted a few inches further into the cable between the insulation and the inner-conductors and the operation repeated. It will be obvious that this is a time consuming and extremely expensive operation. Experience has shown that it takes one man approximately two hours to strip eight feet of insulation from the end of a 1½ inch diameter cable by this process. Using the cable stripping machine of the present invention, this same operation can be performed in less than one minute.

The principal object of this invention, therefore, is to provide a cable stripping machine which will automatically remove the insulation from a cable without damage to the inner-conductors. The machine herein provided permits the removal of insulation from the inner-conductors of a cable in an extremely efficient and economical manner. The present invention provides a cable stripping machine which may be utilized wtih cables of different diameters. The cable stripping machine herein provided is also suitable for use with different types and thicknesses of cable insulation. Another object of this invention is to provide a cutting blade for use in a cable stripping machine which requires that a minimum of force be applied to cut the insulation from a cable and which is employed in such a manner that the insulation is cut while being subjected to tensioning forces. These and other objects and advantages of this invention will become apparent as the following description is read in connection with the accompanying drawings in which:

The basic principle of the present invention resides in a novel cutting blade which is provided with a shoe at the lower extremity thereof and in a positioning wheel which acts against the cable to be stripped to cause the insulation of the cable to separate from the inner-conductors immediately in front of the cutting blade so that the shoe will become disposed therebetween. The blade then cuts the insulation while exerting a tensioning force against the insulation. The shoe provides foolproof protection to the inner-conductors from damage by the cutting blade.

Figure 1:
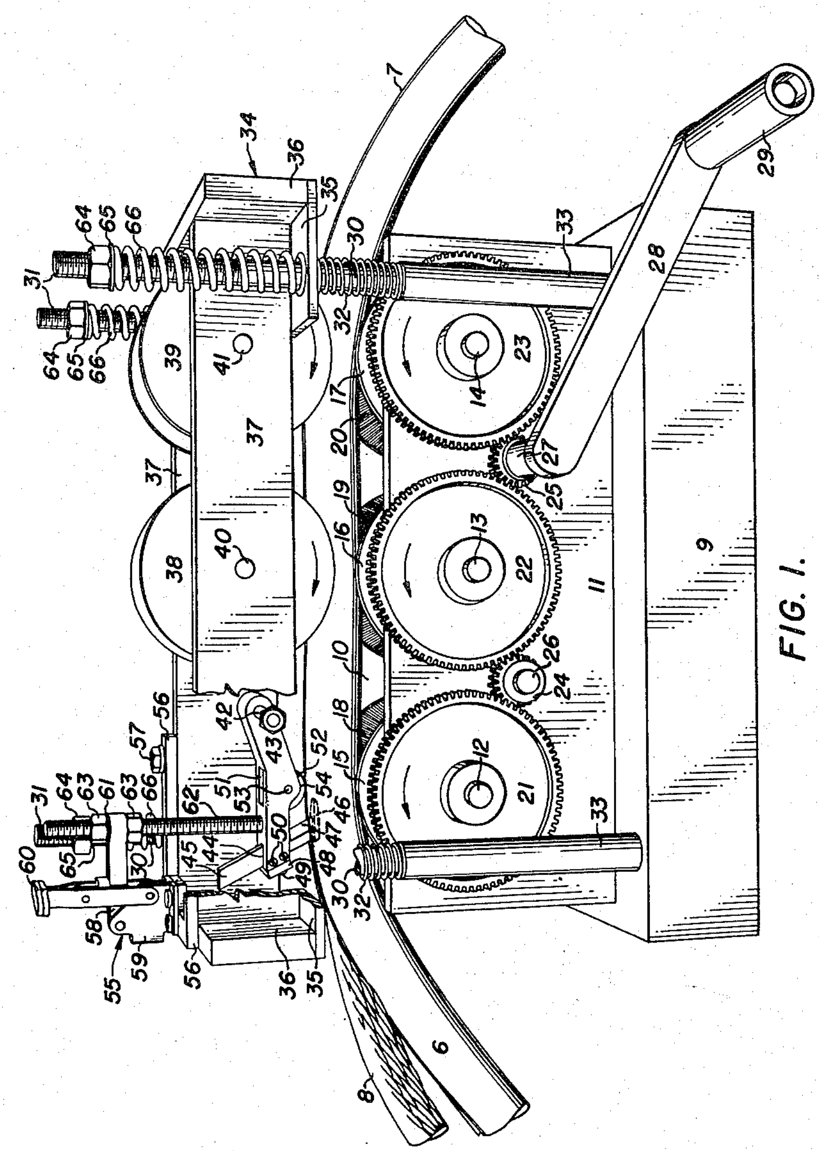
FIGURE 1 is a perspective view, partially cut away, of a cable stripping machine employing the principles of this invention.

Referring first to FIGURE 1 in detail, a cable stripping machine incorporating the principles of the present invention is illustrated being utilized to remove the insulation 6 of a cable 7 from the inner-conductors 8 thereof. Mounted in parallel alignment on a base 9 are two vertical support plates 10 and 11. Disposed between the vertical support plates 10 and 11 and rotatably connected thereto are parallel axles 12, 13 and 14. V-grooved rollers 15, 16 and 17 are mounted on the axles 12, 13 and 14 respectively, between the vertical support plates 10 and 11, being keyed to their respective axle so as to rotate therewith. The surfaces 18, 19 and 20 of the V-grooved rollers 15, 16 and 17 are preferably serrated to provide for better traction with the cable 7. The axles 12, 13 and 14 extend beyond the outer face of the vertical support plate 11 and have spur gears 21, 22 and 23 keyed thereto. Spur gears 24 and 25 are keyed to shafts 26 and 27, respectively, which in turn are rotatably mounted to the vertical support plate 11. The spur gears 21, 22, 23, 24 and 25 engage each other as illustrated in FIGURE 1 to form a gear train. Mounted to one end of the shaft 27 is a crank arm 28, to which a handle 29 is rotatably connected. When an operator causes the crank arm 28 to be rotated in a clockwise direction, the gear train will operate to rotate the V-grooved rollers 15, 16 and 17 in a counterclockwise direction.

Connected to the base 9 in the vicinity of each of the four corners thereof are rods 30, which are provided with threads 31 at their upper extremities. Disposed on each of the rods 30 is a spring 32. A tubular member 33 covers each of the springs 32, being mounted to the base 9. A floating carriage 34, comprising a set of horizontal plates 35, a pair of end plates 36 and a pair of cross-members 37, is supported from the base 9 by the springs 32, the horizontal plates 35 being suitably provided with holes therein to receive the rods 30 therethrough. A pair of V-grooved rollers 38 and 39 are disposed between the cross-members 37 of the floating carriage 34 being keyed to rotate with axles 40 and 41, respectively, which are rotatably supported by the cross-members 37. These V-grooved rollers 38 and 39 are located directly over the V-grooved rollers 16 and 17, respectively. A rod 42 is supported between the cross-members 37 by any suitable means. Pivotally connected to the rod 42 is a blade carriage 43, which is provided with a slot 44 to slideably receive a blade 45. At its lower extremity, the blade 45 is provided with a shoe 46 which extends in front of its cutting edge 47. A retaining plate 48 is connected to the blade carriage 43 by screws 49 to retain the blade 45 in the slot 44. The blade 45 is therefore free to slide in the slot 44 and is positioned therein by set screws 50 which seat against the side of the blade. The blade carriage 43 is provided with an aperture 51 to receive a positioning wheel 52 which is mounted on a pin 53 journaled in the carriage and which extends from the underside 54 of the blade carriage 43.

A clamp 55, which is commercially available as the Detroit Stamping Company's Part No. 202T, is mounted by any suitable means to a U-shaped plate 56, which in turn is supported on one of the end plates 36 and the cross-members 37 of the floating carriage 34. A plurality of screws 57 fasten the U-shaped plate 56 to the end plate 36 and the cross-members 37. One end of an arm 58 of the clamp 55 is pivotally connected to a bracket 59 of the clamp 55. The clamp 55 includes a handle 60 which is pivotally connected to the bracket 59 and to the arm 58 in a manner such that rotation of the handle will cause the arm 58 to rotate and, further, that will lock the arm 58 in a horizontal position when the handle 60 is in the upright position. The arm 58 of the clamp 55 has one end formed with a cylindrical bore 61 to slideably receive a threaded rod 62. Lock nuts 63 cooperate with the threads of the threaded rod 62 and are disposed on either side of the arm 58 to lock the threaded rod 62 to the arm 58. The lower end of the threaded rod 62 restrains the upward rotation of the blade carriage 43 on the rod 42. Each of the rods 30 is provided with a nut 64, which cooperates with the threads 31 provided thereon, and with a washer 65. A spring 66 is disposed around each of the rods 30, being restrained between the washers 65 and the horizontal plates 35 of the floating carriage 34. The springs 66 are sized larger than the springs 32 and, consequently, exert a greater force on the floating carriage 34 than the force exerted thereon by the springs 32.

As may be seen by reference to FIGURE 1, rough positioning of the positioning wheel 52 is obtained when the cable 7 is inserted between the upper V-grooved rollers 38 and 39 and the lower V-grooved rollers 15, 16 and 17 and under the positioning wheel 52. Fine positioning of the positioning wheel 52 is obtained by adjusting the lock nuts 63 to raise or lower the threaded rod 62 in order that the lower end thereof will restrain the upward rotation of the blade carriage 43 at the proper point. The optimum fine position of the positioning wheel 52 will depend upon the type of cable insulation 6 and the thickness thereof. It has been determined that the best results are usually obtained when the positioning wheel 52 is caused to become indented into the insulation 6 of the cable 7 a distance equal to approximately one-half of the normal thickness of the insulation. The proper positioning of the blade 45 in the blade carriage 43; that is, the distance that the toe of the shoe 46 should be disposed below the positioning wheel 52, will also depend upon the type and thickness of the insulation 6. The blade 45 is adjusted to its proper position in the slot 44 and locked thereat by tightening the set screws 50 against the side of the blade.

In operation, after the positioning wheel 52 and the blade 45 have been properly positioned as described in the preceding paragraph, the cable 7 is inserted into the cable stripping machine herein provided between the V-grooved rollers 17 and 39 and against the force exerted on the floating carriage 34 by the springs 66. The action of the springs 66 assures intimate gripping of the cable 7 by the rollers 17 and 39 regardless of the outside diameter of the cable. After the cable 7 has been positioned between the V-grooved rollers 17 and 39, the crank arm 28 is turned in a clockwise direction thereby rotating the V-grooved rollers 15, 16 and 17 in a counterclockwise direction and drawing the cable through the machine towards the blade 45. As may be better seen in FIGURE 2, as the forward end of the cable 7 passes under the positioning wheel 52, the force which is exerted thereon by the positioning wheel causes the insulation 6 to become stretched under tension immediately behind the point of contact between the positioning wheel and the cable. The leading edge of the insulation 6 is thereby deformed outwardly, separating from the inner-conductors 8. This condition permits the shoe 46 of the blade 45 to enter the cable 7 between the inner-conductors 8 and the insulation 6, with the shoe tending to increase the tensional force acting on the insulation 6. When the insulation 6 makes contact with the cutting edge 47 of the blade 45, one component of the force exerted thereon by the blade acts against the insulation in an upward direction thereby still further increasing the tensional force on the insulation. The insulation 6 is sliced by the cutting edge 47 of the blade 45 as it passes thereover and, the fact that the insulation is maintained under tension at this point, causes the insulation to separate after it has been sliced so as not to come in contact with the sides of the cutting blade behind the cutting edge of the blade. This desirable situation reduces frictional forces between the blade 45 and the insulation 6, which otherwise would increase the amount of force required to propel the cable 7 through the machine. Under certain conditions the force exerted by the blade 45 against the insulation 6 could be sufficient to cause the cable 7 to buckle in the machine in front of the blade and to completely jam the machine.

Figure 2:
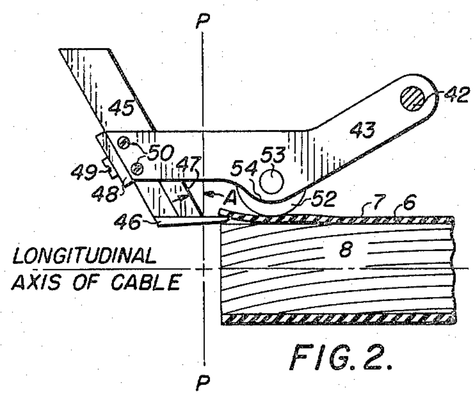
FIGURE 2 is a side elevation view of the blade carriage utilized in the cable stripping machine illustrated in FIGURE 1.

P—P in FIGURE 2 represents a plane which passes through the point at which the cutting edge 47 of the blade 45 joins the shoe 46 and which is normal to the longitudinal axis of the cable 7. It has been found that a greater force is required to cut the insulation 6 by a blade which has a cutting edge normal to the longitudinal axis of the cable 7 than with a blade whose cutting edge 47 is disposed at an angle A (see FIGURE 2) with the plane P—P. This is due to the fact that, when the cutting edge of a blade is normal to the longitudinal axis of the cable 7, there is very little slicing action by the cutting edge against the insulation 6 and, under such condition, the cutting is virtually a pure shearing operation. As the angle A is increased, the slicing effect is increased and the force required to cut the insulation 6 proportionately decreased. When the angle A is greater than 45 degrees, there is a tendency for the insulation 6 to creep up the cutting edge of the blade to a point where it will jam between the cutting edge 47 and the underside 54 of the blade carriage 43. Tests have shown that optimum results can be obtained in most cases when the angle A, between the cutting edge 47 of the blade 45 and the plane P—P, is equal to approximately 30 degrees.

Further cutting of the insulation 6 from the cable 7 is accomplished as the operator continues to rotate the crank arm 28 in a clockwise direction thereby causing the cable 7 to be propelled past the blade 45, the shoe 46 of the blade maintaining its position between the inner-conductors 8 and the insulation 6.

A cable stripping machine, which readily handles cables varying in size from ¾ to 2½ inches in diameter, employs a blade having a shoe which comes to a point 5⁄16 of an inch in front of the cutting edge of the blade and which has a maximum width of ¼ of an inch and a maximum depth of 3⁄32 of an inch. Satisfactory results could be obtained with this machine if the length of the shoe in front of the cutting edge of the blade were between ⅛ and ¾ inch, if its maximum width were between ⅛ and 3/8 inch and its maximum depth were between 1/32 and 5/32 inch. It will be obvious that, if a machine were built in accordance with the principles of this invention to handle different sizes of cables than those indicated above, the shoe of the blade employed would preferably have different dimensions than those previously indicated, but the proportional relationship of those dimensions would still be applicable.

In most cables the inner-conductors 8 are spiraled within the insulation 6. This creates a tendency for the cable 7 to rotate about its longitudinal axis as it passes through the cable stripping machine. It will be obvious that such a rotational movement of the cable 7 would adversely affect the stripping operation. The positioning wheel 52 serves the additional function of preventing rotation of the cable 7 as it passes through the machine herein provided.

Figure 4:
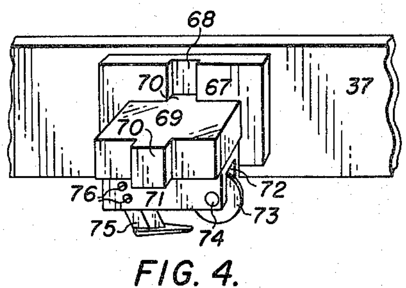
FIGURE 4 is a perspective view of an alternate form of blade carriage, which may be utilized in the cable stripping machine of the present invention and illustrates the method whereby said blade carriage is supported from a floating carriage.
Figure 3:
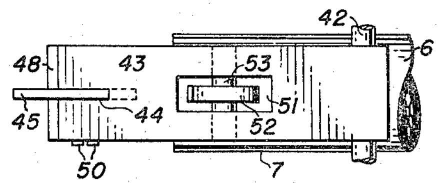
FIGURE 3 is a top plan view of the blade carriage illustrated in FIGURE 1.

While the preferred embodiment of the present invention has been illustrated in FIGURES 1, 2 and 3, an alternate from of blade carriage is shown in FIGURE 4. A pair of blocks 67, each provided with a groove 68 preferably disposed vertically therein, are attached by any suitable means to the inner-faces of the cross-members 37 of the floating carriage 34. A blade carriage 69 includes projections 70 which are designed to cooperate with the grooves 68 of the blocks 67 to support the blade carriage between the cross-members 37 of the floating carriage 34. The blade carriage 69 also includes a lip portion 71 which is provided with a slot 72 in which a positioning wheel 73 is rotatably mounted on a pin 74. A blade 75 is slideably mounted in a slot provided in the lip portion 71 of the blade carriage 69. Set screws 76, cooperating with threaded apertures suitably provided in the lip portion 71 of the blade carriage 69, act against the blade 75 to lock it in a fixed position in the slot provided in the lip portion 71.

Fine positioning of the positioning wheel 73 is obtained by applying the proper amount of pressure on the top of the blade carriage 69 after the end of the cable has become disposed under the positioning wheel 73. The grooves 68 of the blocks 67 and the projections 70 of the blade carriage 69 are designed to permit the projections 70 to rock a limited amount in the grooves 68 when a force is exerted by the cable insulation against the cutting edge of the blade 75. This rocking action of the blade carriage 69 causes a considerable amount of force to be exerted against the sides of the grooves 68 by the projections 70 of the blade carriage 69. The amount of friction thereby developed between the projections 70 and sides of the grooves 68 is sufficient to prevent the blade carriage 69 from sliding in the grooves after fine positioning of the positioning wheel 73 has been established.

Figure 5:
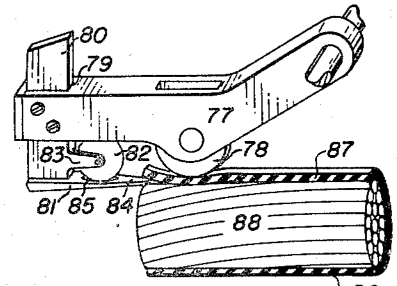
FIGURE 5 is a perspective view illustrating an alternate form of cutting blade which may be employed in accordance with the principles of this invention.

In FIGURE 5 there is illustrated an alternate type of cutting blade which may be utilized in accordance with the principles of this invention. A blade carriage 77 including a rotatable positioning wheel 78 and being very similar in design to the blade carriage 43 illustrated in FIGURES 1, 2 and 3 is provided with a slot 79. Slideably mounted within the slot 79 is an arm 80 which is provided with a shoe 81 at the lower extremity thereof. A circular cutting blade 82 is rotatably mounted to a projection 83, extending from the arm 80 and over the shoe 81. A face 84 of the shoe 81 is provided with a groove 85 which receives the lower edge of the circular cutting blade 82.

As a cable 86 moves under the positioning wheel 78, its insulation 87 is caused to separate from its inner-conductors 88 permitting the shoe 81 to become disposed between the insulation 87 and the inner-conductors 88. When the insulation 87 comes into contact with the circular cutting blade 82, the force exerted thereon by the circular cutting blade causes the insulation to be pinched between the cutting blade and the shoe 81, thereby cutting the insulation. While a greater force is required to strip the insulation from a cable using this type of blade 82 than is required to strip the insulation from the same cable using the blade 45, illustrated in FIGURES 1, 2, and 3 and the blade 75 illustrated in FIGURE 4, there may very well be applications for which this type of blade may be best suited. For instance, a circular cutting blade has a longer life than a straight edged cutting blade and need not be removed from the cable stripping machine for sharpening or replacement as often as a straight edged blade.

This invention may be embodied in other forms without departing from the spirit or essential characteristics thereof. The embodiments of the invention described herein are therefore to be considered as in all respects illustrative and not restrictive, the scope of the invention being indicated by the appended claims, and all changes which come within the meaning and range of equivalency of the claims are intended to be embraced therein.

What is claimed is:

1. In a machine for stripping the insulation from the inner-conductors of a cable and including means for propelling said cable therethrough, an improvement comprising:
   (*a*) a blade carriage;
   (*b*) an arm positioned in said blade carriage including a cutting edged member, said arm being positioned such that said cutting edged member will engage said insulation as said cable is propelled through said machine;
   (*c*) a shoe connected to one end of said arm and projecting from said arm in a direction opposite to that in which said cable is propelled through said machine, said shoe being engageable with said cable between said insulation and said inner-conductors thereof; and
   (*d*) a positioning wheel freely rotatably mounted to said blade carriage and extending beyond the lower face of said blade carriage in front of said shoe with said positioning wheel being displaced a greater distance from the longitudinal axis of said cable than said shoe to exert a normally directed pressure against said insulation causing said insulation to become separated from said inner-conductors immediately in front of the toe of said shoe.

2. The apparatus of claim 1 including means for adjusting the distance between a plane, which is parallel to the longitudinal axis of said cable and which passes through said toe of said shoe, and said positioning wheel.

3. In a machine for stripping the insulation from the inner-conductors of a cable and including means for propelling said cable therethrough an improvement comprising:
   (*a*) a blade carriage;
   (*b*) an arm;
   (*c*) a circular blade rotatably mounted to said arm such that the cutting edge thereof will engage said insulation as said cable is propelled through said machine;
   (*d*) a shoe connected to one end of said arm and projecting from said arm under said blade in a direction opposite to that in which said cable is propelled through said machine, said shoe being engageable with said cable between said insulation and said inner-conductors thereof and cooperating with said cutting edge of said blade to pinch said insulation therebetween thereby cutting said insulation; and
   (*e*) a positioning wheel rotatably mounted to said blade carriage and extending beyond the lower face of said blade carriage in front of said shoe with said positioning wheel being displaced a greater distance from the longitudinal axis of said cable than said shoe and acting against said insulation in a manner causing said insulation to become separated from said inner-conductors immediately in front of the toe of said shoe.

4. The apparatus of claim 3 including means for adjusting the distance between a plane, which is parallel to the longitudinal axis of said cable and which passes through said toe of said shoe, and said positioning wheel.

5. In a machine for stripping the insulation from the inner-conductors of a cable and including means for propelling said cable therethrough, an improvement comprising:

(*a*) a blade carriage;

(*b*) a blade positioned in said blade carriage having its cutting edge engageable with said insulation as said cable is propelled through said machine;

(*c*) a shoe connected to one end of said blade and projecting from said blade in a direction opposite to that in which said cable is propelled through said machine, said shoe being engageable with said cable between said insulation and said inner-conductors thereof; and (*d*) a positioning wheel freely rotatably mounted to said blade carriage and extending beyond the lower face of said blade carriage in front of said shoe with said positioning wheel being displaced a greater distance from the longitudinal axis of said cable than said shoe to exert a normally directed pressure against said insulation causing said insulation to become separated from said inner-conductors immediately in front of the toe of said shoe.

6. The apparatus of claim 5 including means for adjusting the distance between a plane, which is parallel to the longitudinal axis of said cable and which passes through said toe of said shoe, and said polishing wheel.

7. In a machine for stripping the insulation from the inner-conductors of a cable and including means for propelling said cable therethrough, an improvement comprising:

(*a*) an arm including a cutting edged member, said arm being positioned such that said cutting edged member will engage said insulation as said cable is propelled through said machine;

(*b*) a shoe connected to one end of said arm and projecting from said arm in a direction opposite to that in which said cable is propelled through said machine, said shoe being engageable with said cable between said insulation and said inner-conductors thereof; and (*c*) means connected to said arm for exerting an inwardly directed pressure against said cable substantially immediately in front of the toe of said shoe to separate said insulation from said inner-conductors thereby permitting said shoe to enter said cable between said insulation and said inner-conductors.

8. In a machine for stripping the insulation from the inner-conductors of a cable and including means for propelling said cable therethrough, an improvement comprising:

(*a*) an arm;

(*b*) a circular blade rotatably mounted to said arm such that the cutting edge thereof will engage said insulation as said cable is propelled through said machine;

(*c*) a shoe connected to one end of said arm and projecting from said arm under said blade in a direction opposite to that in which said cable is propelled through said machine, said shoe being engageable with said cable between said insulation and said inner-conductors thereof and cooperating with said cutting edge of said blade to pinch said insulation therebetween thereby cutting said insulation; and (*d*) means connected to said arm for exerting a pressure against said cable in front of said shoe to separate said insulation from said inner-conductors thereby permitting said shoe to enter said cable between said insulation and said inner-conductors.

9. In a machine for stripping the insulation from the inner-conductors of a cable and including means for propelling said cable therethrough, an improvement comprising:

(*a*) a blade having its cutting edge engageable with said insulation as said cable is propelled through said machine;

(*b*) a shoe connected to one end of said blade and projecting from said blade in a direction opposite to that in which said cable is propelled through said machine, said shoe being engageable with said cable between said insulation and said inner-conductors thereof; and (*c*) means connected to said blade for exerting an inwardly directed pressure against said cable substantially immediately in front of the toe of said shoe to separate said insulation from said inner-conductors thereby permitting said shoe to enter said cable between said insulation and said inner-conductors.

10. A machine for stripping the insulation from the inner-conductors of a cable comprising:

(*a*) a base;

(*b*) a first roller means mounted on said base for supporting said cable thereon;

(*c*) a floating carriage slideably connected to said base above said first roller means;

(*d*) a second roller means mounted to said floating carriage and cooperating with said first roller means to firmly grip said cable therebetween;

(*e*) a blade carriage mounted to said floating carriage;

(*f*) a blade mounted to and extending from said blade carriage, the cutting edge of said blade being engageable with said insulation;

(*g*) a shoe connected to one end of said arm of said blade and projecting from said blade in a direction opposite to that in which said cable travels through said machine, said shoe being engageable with said cable between said insulation and said inner-conductors thereof;

(*h*) a positioning wheel rotatably mounted to said blade carriage and extending beyond the lower face of said blade carriage in front of said shoe with said positioning wheel being displaced a greater distance from a longitudinal axis of said cable than said shoe and acting against said insulation in a manner causing said insulation to become separated from said inner-conductors immediately in front of the toe of said shoe; and (*i*) means for rotating said first roller means thereby causing said cable to be propelled under said positioning wheel towards said blade, said insulation being cut by said cutting edge of said blade as said cable is propelled past said blade.

11. The apparatus of claim 10 including means for adjusting the force with which said positioning wheel acts against said cable in order to obtain the proper amount of separation of said insulation from said inner-conductors.

12. The apparatus of claim 10 including means for adjusting the distance between a plane, which is parallel to the longitudinal axis of said cable and which passes through said toe of said shoe, and said positioning wheel.

13. The apparatus of claim 10 wherein one end of said blade carriage is pivotably mounted to said floating carriage and including additional means engageable with the upper face of said blade carriage to restrain the upward movement thereof at a pre-selected position against the force exerted thereon by said cable as said cable is propelled through said machine.

14. The apparatus of claim 10 wherein said floating carriage includes a pair of spaced apart blocks, each of said blocks having a vertical groove on the inner surface thereof, and wherein said blade carriage is positioned between said pair of blocks and includes projections which slideably engage said pair of grooves of said blocks, the width of said projection being less than the width of said grooves thereby permitting said projection to be rocked a limited amount within said grooves.

References Cited by the Examiner

UNITED STATES PATENTS

| | | | |
|---|---|---|---|
| 1,825,132 | 9/31 | Shopis et al. | 83—447 |
| 1,929,915 | 10/33 | Deitz et al. | 81—9.51 |
| 2,360,363 | 10/44 | Pope | 81—9.51 X |
| 2,366,271 | 1/45 | Lerch | 81—9.51 X |
| 2,391,721 | 12/45 | Lundeen | 81—9.51 X |
| 2,413,192 | 12/46 | Pope | 81—924 X |
| 2,435,660 | 2/48 | Tileston | 83—924 X |
| 2,561,218 | 7/51 | Norman et al. | 81—9.51 X |
| 2,691,822 | 10/54 | Vaughan. | |
| 2,721,384 | 10/55 | Bell | 30—91 |
| 2,740,473 | 4/56 | Ewaldson et al. | 81—9.51 X |
| 2,873,489 | 2/59 | Hirschborn | 81—9.51 X |
| 3,109,332 | 11/63 | Rando | 81—9.5 |

FOREIGN PATENTS

| | | |
|---|---|---|
| 380,048 | 9/23 | Germany. |
| 661,022 | 6/38 | Germany. |
| 962,717 | 4/57 | Germany. |

WILLIAM FELDMAN, *Primary Examiner.*

MILTON S. MEHR, *Examiner.*